United States Patent
Rossi et al.

(10) Patent No.: US 10,235,182 B2
(45) Date of Patent: Mar. 19, 2019

(54) SYSTEM AND METHOD FOR HYBRID TASK MANAGEMENT ACROSS CPU AND GPU FOR EFFICIENT DATA MINING

(71) Applicant: Palo Alto Research Center Incorporated, Palo Alto, CA (US)

(72) Inventors: Ryan A. Rossi, Mountain View, CA (US); Rong Zhou, San Jose, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 18 days.

(21) Appl. No.: 15/628,153

(22) Filed: Jun. 20, 2017

(65) Prior Publication Data

US 2018/0365019 A1 Dec. 20, 2018

(51) Int. Cl.
*G06F 9/38* (2018.01)
*G06F 17/30* (2006.01)

(52) U.S. Cl.
CPC ...... *G06F 9/3877* (2013.01); *G06F 17/30539* (2013.01)

(58) Field of Classification Search
None
See application file for complete search history.

(56) References Cited

U.S. PATENT DOCUMENTS

2017/0255496 A1* 9/2017 Deng ............... G06F 9/4881

OTHER PUBLICATIONS

Fang et al. (Parallel Data Mining on Graphics Processors, Technical Report HKUSTCS0807, Oct. 2008).*

* cited by examiner

*Primary Examiner* — Kyle Zhai
(74) *Attorney, Agent, or Firm* — Shun Yao; Park, Vaughan, Fleming & Dowler LLP

(57) ABSTRACT

Embodiments described herein provide a system for facilitating hybrid task management across a central processing unit (CPU) and a graphics processing unit (GPU) of a computer. During operation, the system determines a set of tasks for performing data mining on a data set and storing the set of tasks in a data structure in an ascending order of uniformity associated with a respective task. The uniformity of a task indicates how uneven and skewed the task is compared to other tasks in the set of tasks. The system then allocates a subset of tasks to a core of the CPU from a front of the data structure and a subset of tasks to a core of the GPU from a back of the data structure.

18 Claims, 14 Drawing Sheets

SYSTEM AND METHOD FOR HYBRID TASK MANAGEMENT ACROSS CPU AND GPU FOR EFFICIENT DATA MINING

BACKGROUND

Field

This disclosure is generally related to the balancing of a data mining work load. More specifically, this disclosure is related to a method and system for managing and load-balancing data mining tasks across the multiple cores of a central processing units (CPU) and a graphics processing units (GPU).

Related Art

With the advancement of computer and network technologies, various operations performed by users of different applications have led to extensive use of data mining. This proliferation of the Internet and Internet-based user activity continues to create a vast amount of digital content. In addition, scientific explorations (e.g., protein synthesis) continue to demand more data processing in a short amount of time. This rise of big data has brought many challenges and opportunities. Recent heterogeneous high performance computing (HPC) architectures offer viable platforms for addressing the computational challenges of mining and learning with big data. General-purpose graphics processing units (GPGPUs) are becoming increasingly important with applications in scientific computing and machine learning.

Typically, a GPU offers cost-effective, high-performance solutions for computationally intensive data mining applications. For example, a high-performance GPU can have a large number of cores capable of performing over 5 trillion floating-point operations per second (TFLOPS). On the other hand, a typical high-performance, server-grade processor can perform about 0.75 TFLOPS, but may cost significantly more. In addition to TFLOPS, a GPU also include higher memory bandwidth than a CPU. For data-intensive algorithms, such as data mining techniques used for big data analysis, higher memory bandwidth can allow an application to process more data in the GPU than in the CPU in the same amount of time. These features of a GPU become particularly useful for processing uniform data. On the other hand, a CPU typically has higher processing power. Therefore, a CPU is more capable in processing non-uniform data.

While allocating tasks to the multiple cores of a CPU or a core of a GPU brings many desirable features to data mining, some issues remain unsolved in efficiently facilitating data mining on a graphical representation of a data set.

SUMMARY

Embodiments described herein provide a system for facilitating hybrid task management across one or more central processing units (CPUs) and one or more graphics processing units (GPUs) of a computer. During operation, the system determines a set of tasks for performing data mining on a data set and storing the set of tasks in a data structure in an ascending order of uniformity associated with a respective task. The uniformity of a task indicates how uneven and skewed the task is compared to other tasks in the set of tasks. The system then allocates a subset of tasks to a first CPU of the one or more CPUs from a front of the data structure and a subset of tasks to a first GPU of the one or more GPUs from a back of the data structure.

In a variation on this embodiment, determining the set of tasks includes determining a strength of relationship between a first and a second data element in the data set, and representing the strength of relationship as an edge between a first vertex representing the first data element and a second vertex representing the second data element in a graph.

In a variation on this embodiment, a respective task includes determining a count for a set of graphlets based on an edge or a vertex of a graph. The uniformity is then associated with a task based on the uniformity of the edge or the vertex, respectively.

In a variation on this embodiment, the system determines a count of subgraphs formed with an edge or a vertex of the graph.

In a variation on this embodiment, the system determines one of: (i) sets of graph properties for respective edges of the graph, and (ii) sets of graph properties for respective vertices of the graph. The system then combines the counts of the sets of graph properties to determine a global set of graph properties for the graph.

In a further variation, the system calculates additional graph properties from the sets of graph properties for respective edges or vertices of the graph based on constant time computations.

In a further variation, the system searches for the sets of graph properties for respective edges or vertices of the graph using one of: a binary search and a hash function.

In a variation on this embodiment, each of the of the one or more CPUs and the one or more GPUs includes a plurality of cores.

In a variation on this embodiment, the system determines the subset of tasks allocated to the first GPU by determining a non-overlapping set of tasks for a respective GPU of the one or more GPUs from the back of the data structure.

In a variation on this embodiment, if the first CPU completes its task, the system allocates a task from a front of a subset of an unallocated task to the first CPU. Similarly, if the first GPU completes its task, the system allocates a task from a back of a subset of the unallocated task to the first GPU.

BRIEF DESCRIPTION OF THE FIGURES

In the figures, like reference numerals refer to the same figure elements.

DETAILED DESCRIPTION

Figure 1A:
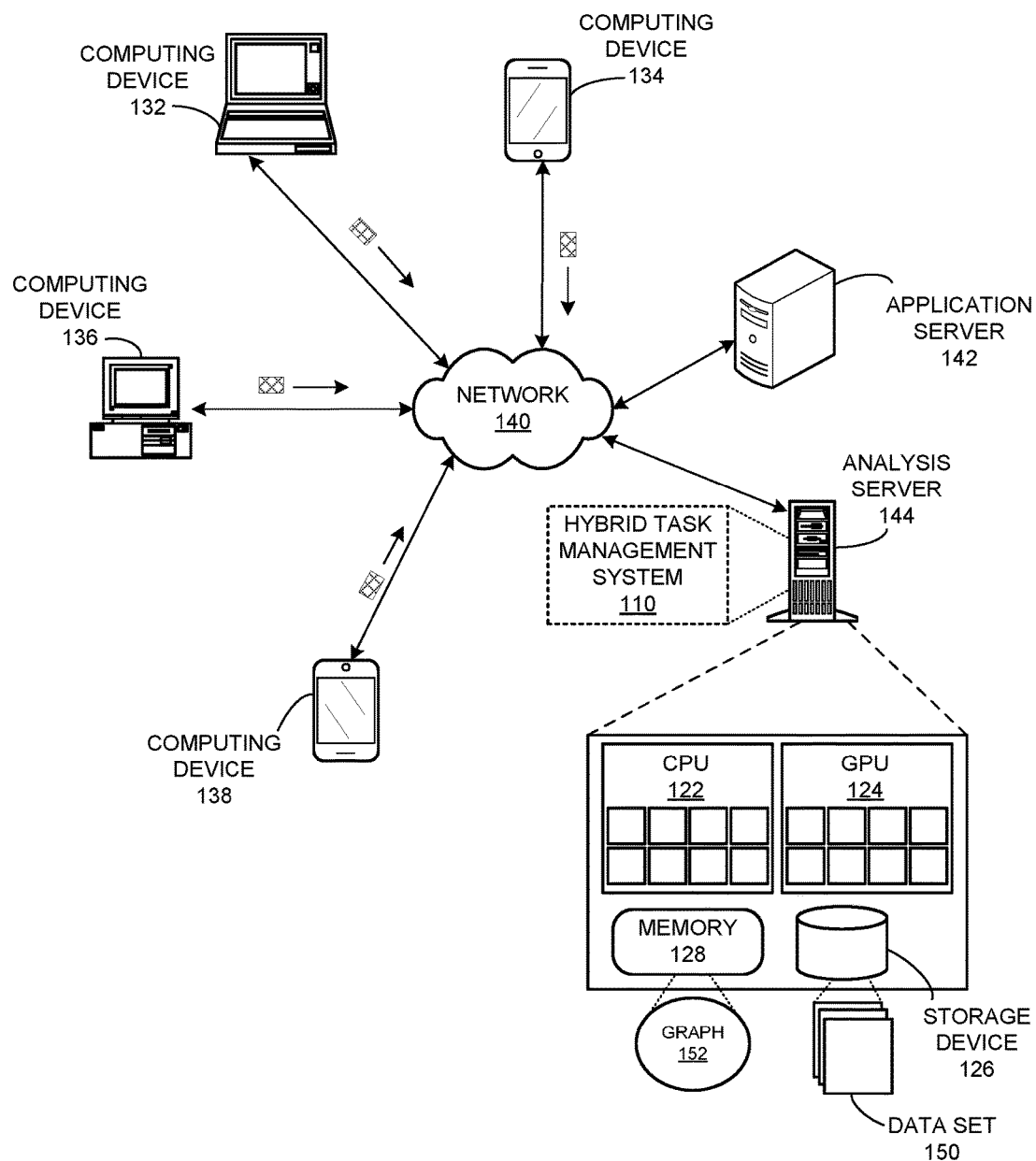
FIG. 1A illustrates an exemplary hybrid task management system for distributing data mining tasks across multiple CPUs and GPUs, in accordance with an embodiment described herein.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein is not limited to the embodiments shown, but is to be accorded the widest scope consistent with the principles and features disclosed herein.

Overview

Embodiments described herein solve the problem of efficiently performing graph-based data mining by facilitating a system that dynamically allocates graph-based data mining tasks across the multiple cores of a CPU and a GPU. Similarly, the system can allocate data mining tasks across multiple CPUs and GPUs of a multi-processing-unit computer. Since a large data set includes both uniform and non-uniform data, a heterogeneous (hybrid) computing architecture consisting of one or more multi-core CPUs and one or more multi-core GPUs is an attractive solution for efficiently facilitating data mining for a large data set. In this way, the system can efficiently compute graph properties or features associated with vertices or edges of the graph using multiple processing (e.g., where the values and the tasks required to compute the values are heavily skewed).

The system decomposes a graph to compute the graph properties locally in a CPU or GPU to perform the computations in parallel and minimize inter-core communication. An example of such a graph property can be a graphlet-count for a graph. A graphlet is an induced subgraph of the graph. Graphs can be used for machine learning and data mining applications that can determine fundamental features in a large data set. For instance, a graphlet count in a graph of a network can represent important features that characterize the network structure, such as relational classification, network alignment, etc.

With existing technologies, graph-based data mining techniques are time-consuming. For example, current methods for determining some graph properties are typically limited to graphs of relatively small size. Current algorithms are usually directed to utilizing a multi-core CPU. Even though a CPU can perform complex operations, the CPU can have lower bandwidth and are often inefficient in graph-related computations. On the other hand, a GPU may have higher bandwidth and are designed for uniform computations (e.g., matrix multiplications). Current technologies leverage a single GPU for data mining using graphs that are well-balanced. However, in real-world applications, graphs typically have a number of non-uniform vertices have varying degrees (e.g., vertices that are coupled to a different number of edges) and some vertices with uniform degrees (e.g., vertices that are coupled to a similar number of edges). As a result, using only CPU cores or a single GPU core may work only in limited and specific scenarios and lead to slower computations.

To solve this problem, embodiments described herein provide a hybrid task management system that can allocate data mining tasks across multiple CPU and GPU cores in a load-balanced way. Furthermore, if a computer is equipped with multiple CPUs and/or GPUs, the system can distribute the tasks across multiple CPUs and/or GPUs as well. During operation, to perform data mining on a data set, the system can represent a respective element in the data set as a vertex of a graph. The system can represent the strength of a relationship between a data element pair as an edge between the vertices representing the data element pair. In this way, the system represents a data set as a graph. To obtain critical information from the graph, the system applies graph-based data mining techniques on the data set.

Typically, such a graph generated from a real-world data set can have uneven distributions of the number of edges connected to the vertices. For example, some vertices can have only a few edges, some vertices can have no edges (i.e., disconnected vertices), yet some vertices can have millions of edges. Such heterogeneity can cause significant load-balancing issues, especially for a GPU, which is designed to solve problems with uniform workloads (e.g., dense matrix-matrix multiplication). Therefore, the hybrid task management system dynamically divides the work between GPUs and CPUs to reduce inter-processor communication, synchronization and data transfer overheads.

Suppose that the graph properties that the system determines is based on the graphlets of the graph. To efficiently compute the graphlets in parallel, the system uses edges (or vertices) to determine and count the graphlets in the graph. Edge-based decomposition of the graph yields a set of independent edge-centric neighborhoods that can be processed in parallel. It should be noted that the system can also use vertices to determine and count the graphlets in the graph. The system can sort the edges of the graph based on uniformity. For example, an edge with a skewed, irregular, and unbalanced degree (e.g., the combination of degrees of the two vertices of the edge) is considered a non-uniform edge. A non-uniform edge may require significantly more processing compared to a uniform edge. The system capitalizes on the fact that a GPU is generally best for computations that are well-balanced and regular, whereas a CPU is designed for a wide variety of applications and thus are more flexible. Therefore, the system allocates the non-uniform edges to the CPU and the uniform edges to the GPU to compute graphlets.

In this way, the system efficiently uses both CPU and GPU to perform graph-based data mining on the data set. In some embodiments, the system only identifies micro graphlets from the graph. A micro graphlet is a graphlet derived from an edge or vertex, and within a predefined size (e.g., less than or equal to four vertices). The system then uses the micro graphlets to compute the graphlets for the entire graph in constant time. As a result, the system achieves further improvement in efficient task management for graph-based data mining.

Although the instant disclosure is presented using examples based on graphlet-based data mining, embodiments described herein are not limited to graphlet-based computations or a size of a graphlet, or a graph representing a data set. Embodiments described herein can also be applied to any data mining task allocation based on uniformity. In this disclosure, the term "data mining" is used in a generic sense, and can refer to any feature extraction techniques applied to any data set.

The system can compute any graph property, measure, and/or function that may follow power-laws, are skewed, etc. Such computation can include computations of graph properties or features associated with vertices/edges of the graph using multi-core CPUs and GPUs where the values and the work required to compute them are heavily skewed. Examples of other such computation include, but are not limited to, PageRanks, "betweenness scores" for vertices and/or edges.

Hybrid Task Management System

FIG. 1A illustrates an exemplary hybrid task management system for distributing data mining tasks across multiple CPUs and GPUs, in accordance with an embodiment described herein. In this example, a large number of computing devices 132, 134, 136, and 138 provide data to an application server 142. These computing devices are coupled via a network 140, which can be a local or wide area network, to application server 142. Application server 142 can collect the data from the computing devices and generate a data set 150. It should be noted that data set 150 can also be provided to application server 142 from other sources. Application server 142 can provide data set 150 to an analysis server to perform data mining operations on data set 150.

To perform data mining on data set 150, analysis server 144 can store data set 150 in a local storage device 126. Analysis server 144 can represent data set 150 as a graph 152. For example, analysis server 144 can load graph 152 in memory 128 to perform graph-based data mining on graph 152. If analysis server 144 executes existing graph-based data mining techniques on graph 152, the process may become time-consuming and can limit the size of graph 152 (e.g., can be feasible for graphs of relatively small size). In addition, even though multi-core CPU 122 can perform complex operations, CPU 122 may have lower bandwidth than multi-core GPU 124 of analysis server 144. In this example, CPU 122 and GPU 124 can be m and n cores, respectively. It should be noted that CPU 122 can include multiple processing units (i.e., individual CPUs), each with multiple cores. Similarly, GPU 124 can have multiple processing units (i.e., individual GPUs), each with multiple cores.

GPU 124 can have higher bandwidth and is designed for uniform computations. Current techniques can use a single GPU for performing data mining on graph 152. However, such techniques may require graph 152 to be well-balanced (e.g., the degrees of the edges are uniform). However, since data set 150 can be obtained from real-world applications, graph 152 can have a number of non-uniform vertices have varying degrees (e.g., vertices that are coupled to a different number of edges) and some vertices with uniform degrees (e.g., vertices that are coupled to a similar number of edges). As a result, using only multiple processing units in CPU 122 or a single processing unit in GPU 124 may impose limitations on graph 152 and lead to slower computations.

To solve this problem, embodiments described herein provide a hybrid task management system 110 running on analysis server 144. System 110 can allocate data mining tasks across multiple processing units of CPU 122 and multiple processing units of GPU 124 in a load-balanced way. During operation, to perform data mining on data set 150, system 110 can represent a respective element in data set 150 as a vertex of graph 152. System 110 can represent a type and strength of relationship between a data element pair as an edge between the vertices representing the data element pair in graph 152. In this way, system 110 represents data set 150 as a graph 152. To obtain critical information from graph 152, system 110 applies graph-based data mining techniques on the graph 152. An example of graph-based data mining can be graphlet computation for graph 152.

System 110 decomposes graph 152 into a number of independent edge-centric (or vertex-centric) neighborhoods. Computations can be performed in parallel for these edge-centric neighborhoods. It should be noted that system 110 can also decompose graph 152 into a number of independent vertex-centric neighborhoods. Computations can be performed in parallel for these vertex-centric neighborhoods as well. System 110 can use different cores or processing units of CPU 122 to compute data mining tasks in different neighborhoods in parallel. Similarly, system 110 can use different processing units of GPU 124 to compute data mining tasks in different neighborhoods in parallel. For example, depending on the uniformity of the degree of an edge, system 110 dynamically distributes the edge-centric computations to either to CPU 122 or GPU 124. In particular, system 110 allocates the edge-centric computations that are unbalanced and highly skewed to CPU 122. On the other hand, since GPU 124 can efficiently compute well-balanced and uniform edge neighborhoods, system 110 allocates uniform edge neighborhoods to GPU 124. In this way, system 110 uses the complementary features of CPU 122 and GPU 124 to achieve efficient task management for data mining.

Figure 1B:
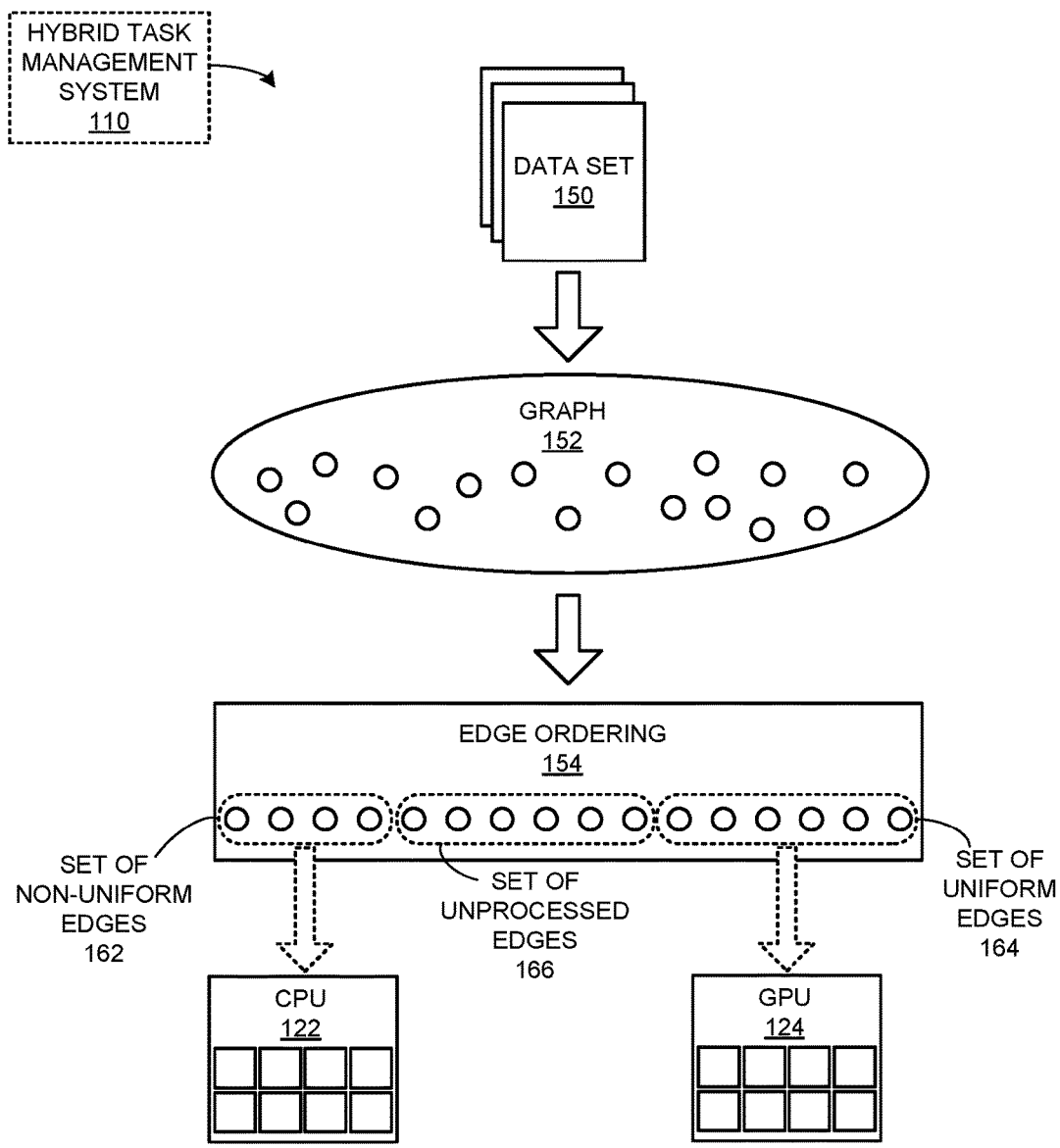
FIG. 1B illustrates an exemplary allocation of graph-basedgraph-based data mining tasks across multiple CPUs and GPUs by a hybrid task management system, in accordance with an embodiment described herein.

FIG. 1B illustrates an exemplary allocation of graph-based data mining tasks across multiple CPUs and GPUs by a hybrid task management system, in accordance with an embodiment described herein. Here, multiple CPUs can indicate multiple cores or multiple processing units. Since graph 152 is generated from real-world data set 150, graph 152 can have uneven distributions of the number of edges connected to the vertices. For example, some vertices can have only a few edges, some vertices can have no edges (i.e., disconnected vertices), yet some vertices can have millions of edges. Such heterogeneity in graph 152 can cause significant load-balancing issues, especially for GPU 124, which operates more efficiently on uniform workloads.

Therefore, system 110 dynamically divides the computations for data mining between CPU 122 and GPU 124.

To efficiently perform data mining in parallel, system 110 can use edges, instead of vertices, of graph 152 to perform the data mining task. For example, system 110 can use edges to determine and count the graphlets in graph 152. Edge-based decomposition of graph 152 yields a set of independent edge-centric neighborhoods that can be processed in parallel. In some embodiments, system 110 uses a specialized data structure based on a simplified version of the edge compressed sparse column (edge-CSC) representation. System 110 can use an edge map array from the edge-CSC representation to identify the edges.

System 110 can sort the edges (or vertices) of graph 152 based on uniformity. For example, an edge with a skewed, irregular, and unbalanced degree (e.g., the combination of degrees of the two vertices of the edge) can be considered a non-uniform edge. System 110 sorts the edges of graph 152 into an edge ordering 154 (e.g., an ordered representation) based on the uniformity of the edges. Edge ordering 154 can order the edges from the most non-uniform to the most uniform. If two edges have similar levels of uniformity, system 110 can use respective edge identifiers (e.g., an edge identifier can be a summation or any other combination of the vertex identifiers) or any other property of the edge to break the tie. For example, the edge with a lower identifier can have precedence over an edge with a higher identifier to break the tie.

System 110 then determines how many edges can be allocated to CPU 122 and GPU 124 based on the number of cores of each of the processing unit. If CPU 122 and/or GPU 124 include multiple processing units, system 110 also considers the number of processing units. Based on that determination, system 110 allocates a set of non-uniform edges 162 to CPU 122 from the front of edge ordering 154. Similarly, system 110 allocates a set of uniform edges 164 to GPU 124 from the back of edge ordering 154. In this way, system 110 can use the same edge ordering 154 for allocating edges to both CPU 122 and GPU 124. The rest of the edges in edge ordering 154 remain in a set of unprocessed edges 166 until assigned to CPU 122 or GPU 124.

To efficiently allocate the edges in set 164, system 110 splits the edges in set 164 into a number of disjoint sets based on the number of processing units in GPU 124 to equally distribute the workload among the processing units of GPU 124. In some embodiments, system 110 applies a round-robin distribution on set 164 to generate the disjoint sets. Each processing unit of GPU 124 computes the task centered at each of the edges in the disjoint set allocated to the processing unit. This disjoint set can be considered as a local job queue for that particular processing unit of GPU 124. Similarly, system 110 splits the edges in set 162 into a number of disjoint sets based on the number of cores of each of the one or more processing units of CPU 122 to equally distribute the workload among the cores of CPU 122. A respective processing unit of CPU 122 computes the task centered at each edge in set 162. Once the task is computed for an edge, it is removed from the corresponding local queue (for either CPU 122 or GPU 124).

Once a core or a processing unit of CPU 122 finishes all tasks (e.g., computes graphlets for all edges) in its local queue, system 110 allocates a number of unprocessed edges from the front of set 166 to that core/processing unit (i.e., puts them into the local queue of the core). In some embodiments, system 110 provides the edges to a processing unit, which in turn, pushes the edges to the local queue of the a respective core of that unit. Set 166 can be stored as a global queue for the unprocessed edges. Since edge ordering 154 includes edges in the order of uniformity, the front of set 166 indicates non-uniform edges and the back of set 166 indicates uniform edges. Hence, once the local queue of a processing unit of GPU 124 becomes empty, system 110 allocates a number of unprocessed edges from the back of set 166 (i.e., pushed onto that processing unit's local queue). In some embodiments, system 110 transfers the assigned edges to the corresponding processing unit of GPU 124. It should be noted that, to efficiently store graph 152, the edge-CSC representation of graph 152 and other related data is loaded at the beginning of the computation and not removed until the computation ends.

Finally, system 110 combines the data mining tasks computed at the multiple cores of the one or more processing units of CPU 122 and GPU 124 to derive the global data mined from (e.g., the final graphlet count of) graph 152. In some embodiments, system 110 can compute graphlets that are triangles, cliques, and cycles, and calculate other connected and disconnected graphlets in constant time. In this way, system 110 not only avoids communication overhead and inter-dependencies across the cores of the one or more processing units of CPU 122 and GPU 124, but also reduces space requirements and computation time.

To efficiently engage a respective core/processing unit in CPU 122, once a core/processing unit completes the tasks in its local queue, it immediately takes a number of tasks from the front of set 166. This number can be determined based on the non-uniformity of an edge. For example, if an edge is significantly non-uniform and unbalanced, CPU 122 may obtain only that edge. In other words, the number of tasks obtained from set 166 can be determined to be one. The intuition is that tasks associated with such an edge may take a significant amount of time to complete. On the other hand, communication among the processing units in GPU 124 is more challenging than in CPU 122 because GPUs are designed for independent and uniform computations. Hence, to avoid communication costs, system 110 allocates a large fraction of the edges in edge ordering 154 to set 164 to be processed in GPU 124. For example, for a majority of large real-world graphs, system 110 may initially assign about 80% of the edges to GPU 124.

In addition, to ensure that a respective core of one or more processing units of CPU 122 and GPU 124 remains in use, system 110 can implement "task stealing." For example, if a core of a processing unit completes the tasks allocated to the core and the local queue of the core becomes empty, system 110 can allocate tasks from set 166 to that processing unit. However, if system 110 determines that a redistribution of tasks yields a better efficiency (e.g., set 166 is empty or obtaining from another core incurs less communication cost), system 110 can reallocate the task from the local queue of a core to the queue of another core within the same processing unit or to the other processing unit. This process can be referred to as "task stealing." It should be noted that system 110 can facilitate work stealing across CPU 122 and GPU 124.

In this way, system 110 efficiently uses both CPU 122 and GPU 124 to perform graph-based data mining on data set 150. In some embodiments, system 110 only identifies micro graphlets and uses them to compute higher-order graphlets in constant time. As a result, system 110 achieves further improvement in efficient task management for graph-based data mining.

Hybrid Task Management

Figure 2A:
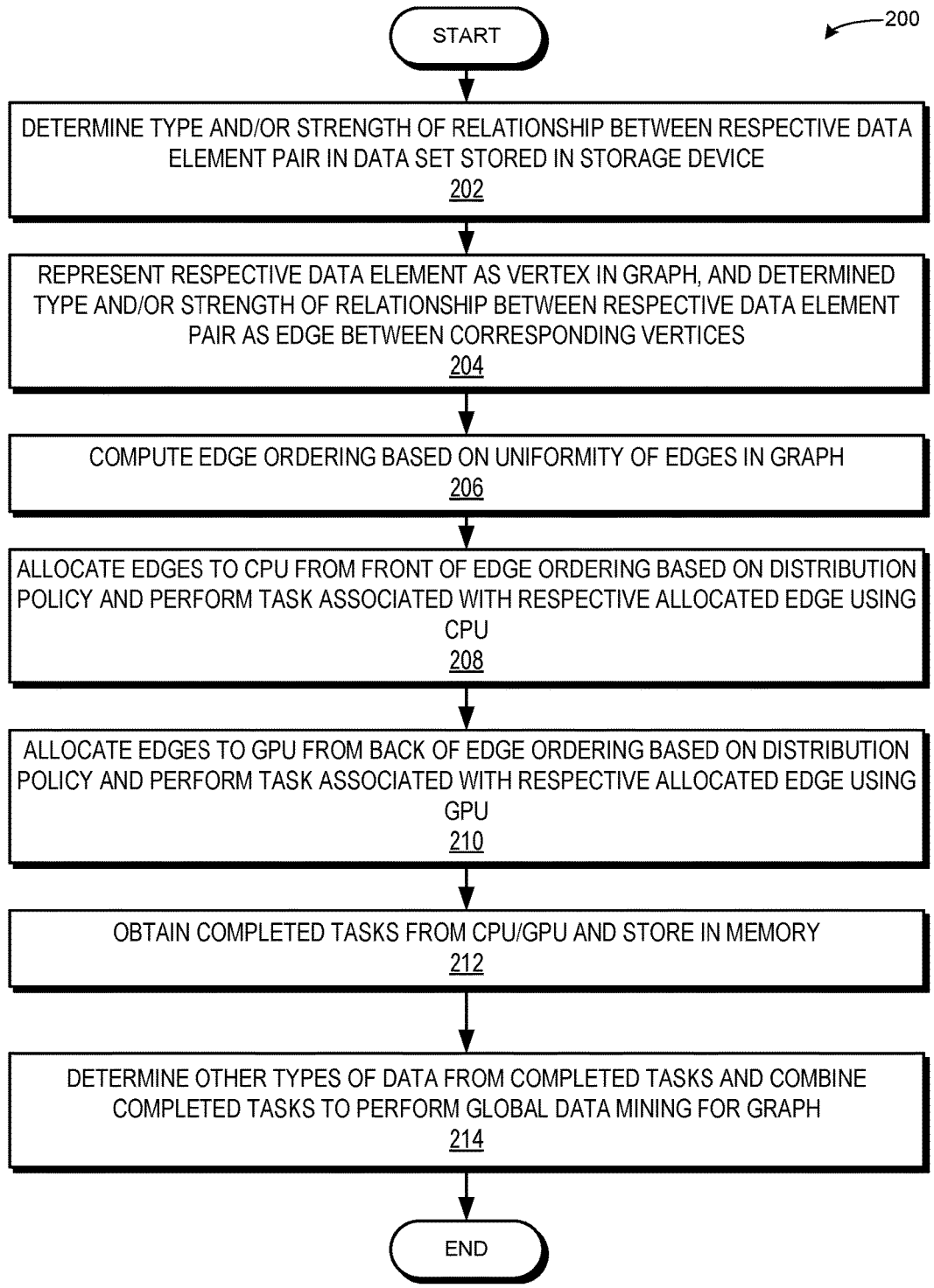
FIG. 2A presents a flowchart illustrating a method of a hybrid task management system allocating graph-based data mining tasks across multiple CPUs and GPUs, in accordance with an embodiment described herein.

FIG. 2A presents a flowchart illustrating a method 200 of a hybrid task management system allocating graph-based data mining tasks across multiple CPUs and GPUs, in accordance with an embodiment described herein. During operation, the system determines a type and/or strength of relationship between a respective data element pair in a data set stored in a storage device (e.g., of a computing device) (operation 202). The system then represents a respective data element as a vertex in a graph, and the determined type and/or strength of relationship between the respective data element pair as an edge between the corresponding vertices (operation 204). The system computes an edge ordering based on the uniformity of the edges in the graph (operation 206).

The system allocates edges to the CPU from the front of the edge ordering based on a distribution policy (e.g., a round-robin distribution) and performs a task (e.g., computes predefined types of micro graphlet counts, such as counts for triangles, cliques, and cycles) associated with a respective allocated edge using the CPU (operation 208). The system allocates edges to the GPU from the back of the edge ordering based on a distribution policy, which can be different from the policy for the CPU, and performs a task (e.g., computes predefined types of micro graphlet counts) associated with a respective allocated edge using the GPU (operation 210). The system obtains the completed tasks (e.g., the micro graphlet counts) from the CPU/GPU and stores them in the memory (operation 212). The system can determine other types of data from the completed tasks and combines the completed tasks to perform global data mining for the graph (e.g., compute other types of graphlet counts from the computed graphlet counts and combines the graphlet counts to determine the graphlet count for the graph) (operation 214).

Figure 2B:
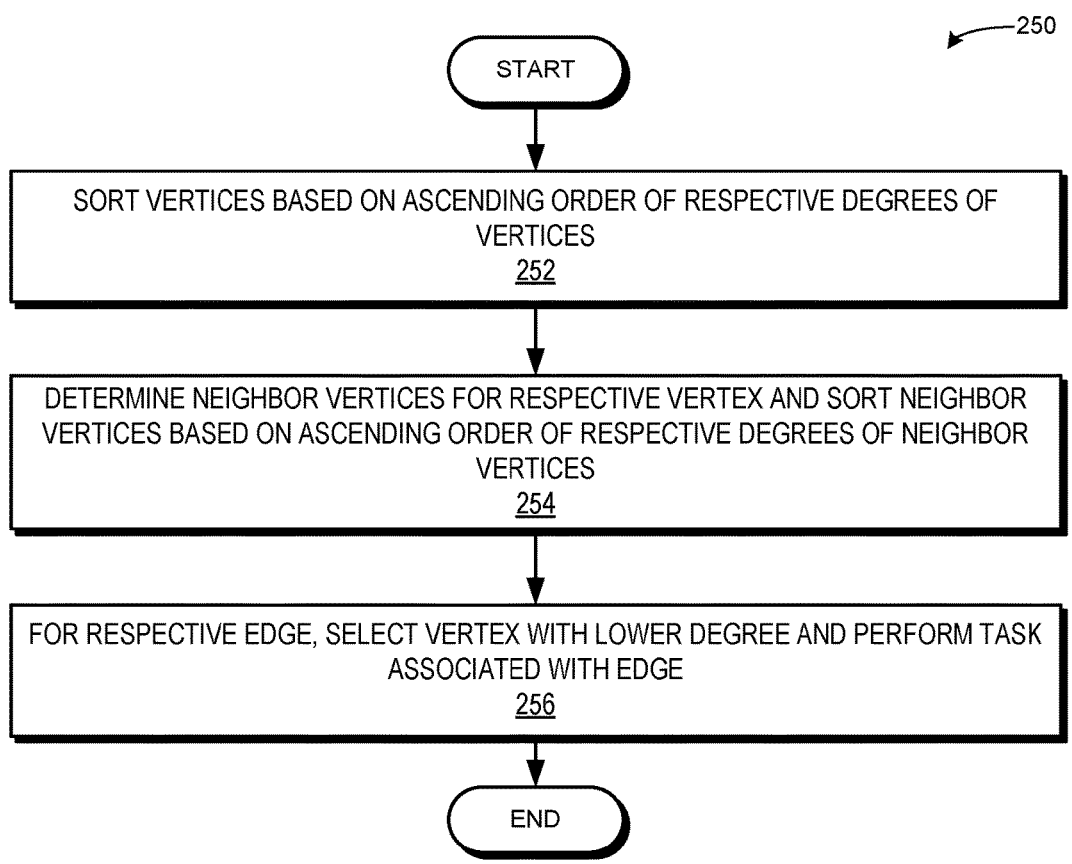
FIG. 2B presents a flowchart illustrating a method of a hybrid task management system performing graph-based data mining, in accordance with an embodiment described herein.

FIG. 2B presents a flowchart illustrating a method 250 of a hybrid task management system performing graph-based data mining using graphlets, in accordance with an embodiment described herein. During operation, the system sorts the vertices based on an ascending order of the respective degrees of vertices (operation 252). The system then determines the neighbor vertices for a respective vertex and sorts the neighbor vertices based on an ascending order of the respective degrees of the neighbor vertices (operation 254). For a respective edge, the system selects the vertex with the lower degree and performs a task (e.g., computes the predefined types of micro graphlet counts) associated with the vertex (operation 256).

This allows the system to ensure that, for any edge, the system can determine which vertex has the larger degree. The system avoids searching for cycles associated with both vertices of the edge since a cycle traverses back to the edge. Instead, the system can count the cycles for the vertex with the lower degree and saves execution time.

Graph Decomposition

Figure 3A:
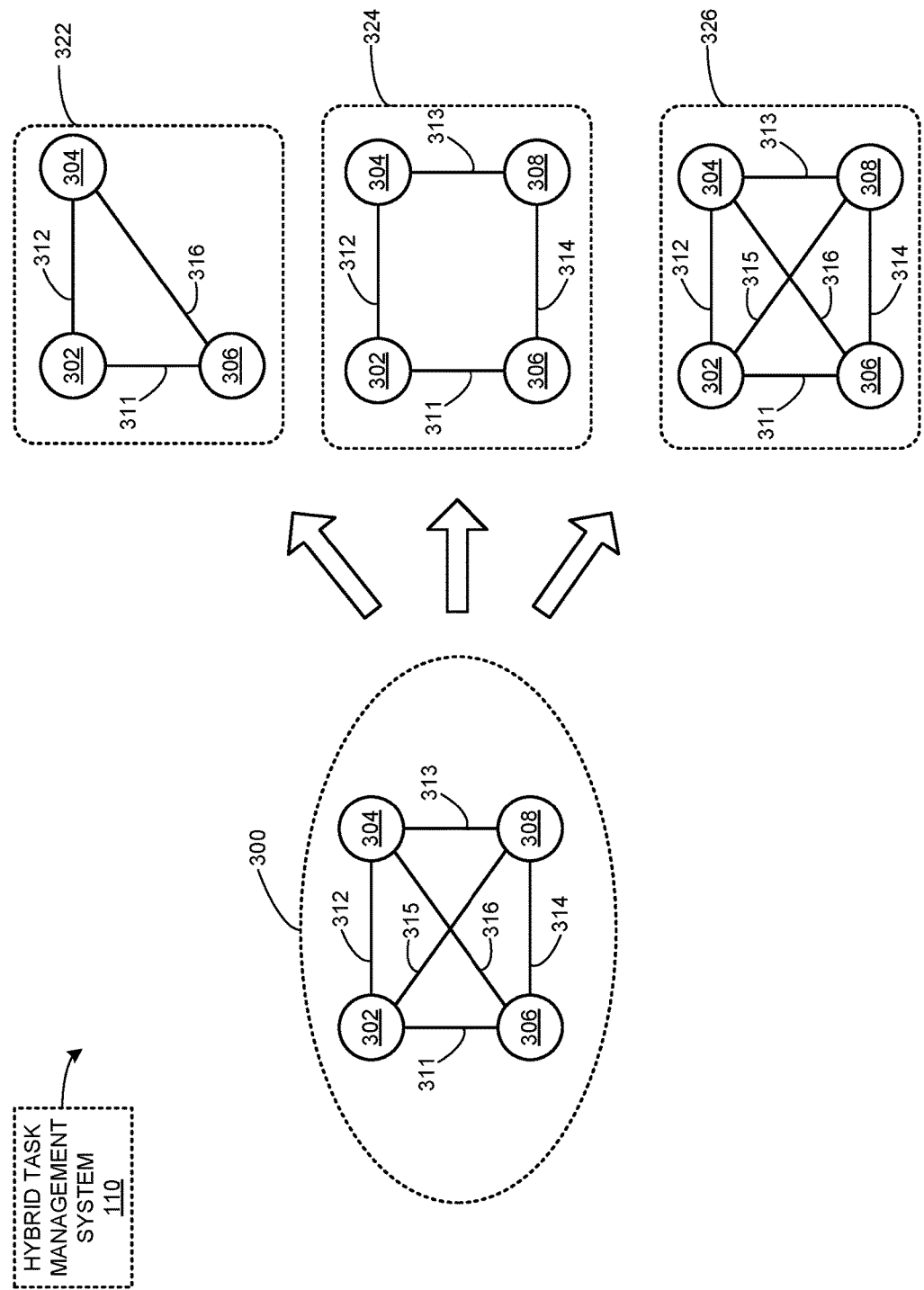
FIG. 3A illustrates an exemplary decomposition of micro graphlets from a graph for performing graph-based data mining, in accordance with an embodiment described herein.

FIG. 3A illustrates an exemplary decomposition of micro graphlets from a graph for performing graph-based data mining, in accordance with an embodiment described herein. In this example, a graph 300 includes a number of vertices 302, 304, 306, and 308, and a number of edges 311, 312, 313, 314, 315, and 316 connecting a respective edge-pair in graph 300. System 110 can order the vertices and edges of graph 300. For example, the degree of vertex 302 can be less than or equal to that of vertex 304. In the same way, the degree of edge 312, which can be the sum of the degrees of vertices 302 and 304, can be less than or equal to that of edge 313.

Next, system 110 determines the neighborhoods of a respective vertex. The neighborhood of vertex 302 includes vertices 304, 306, and 308, each of which has an edge with vertex 302. As a result, the degree of vertex 302 is the size of the neighborhood of vertex 302. System 110 can then determine an edge-induced graphlet for a respective edge in graph 300. For example, a graphlet induced from edge 312 can include the vertices in the union of the neighborhoods of vertices 302 and 304. In addition, the graphlet can include the edges in graph 300 that are between the vertices in the graphlet. To search for the graphlet induced from edge 312, system 110 determines the neighborhood of edge 312 in graph 300. This neighborhood includes the set of all vertices that are connected to the endpoints of edge 312 (i.e., vertices 302 and 304). System 110 explores the subgraph surrounding edge 312 (i.e., the subgraph induced by both its endpoints and the nodes in its neighborhood).

It is important to distinguish between the two fundamental classes of graphlet: connected and disconnected graphlets. A graphlet is connected if there is a path from any node to any other node in the graphlet. System 110 can compute the graphlet counts for both connected and disconnected graphlets in graph 300. More specifically, a graphlet is embedded in graph 300 if there is an injective mapping between the vertices of the graphlet and graph 300 (i.e., at most one vertex of graph 300 maps to a corresponding vertex in the graphlet), and the graphlet includes all edges between its vertices that are present in graph 300. To perform data mining on graph 300, system 110 can identify and count the number of embeddings (appearances) of each graphlet in graph 300.

In the example of FIG. 3A, system 110 determines triangles, cliques, and cycles from graph 300. For example, system 110 can determine a triangle 322 as a connected graphlet, and further obtain a corresponding disconnected graphlet with vertices 302, 304, and 306 (a 3-node-independent graph). Similarly, system 110 can determine a 4-cycle (i.e., a cycle with 4 vertices) 324 as a connected graphlet, and further obtain a corresponding disconnected graphlet with vertices 302, 304, 306, and 308, and edges 312 and 314 (a 4-node-2-edge graph). Moreover, system 110 can determine a 4-clique (i.e., a clique with 4 vertices) 326 as a connected graphlet, and further obtain a corresponding disconnected graphlet with vertices 302, 304, 306, and 308.

Figure 3B:
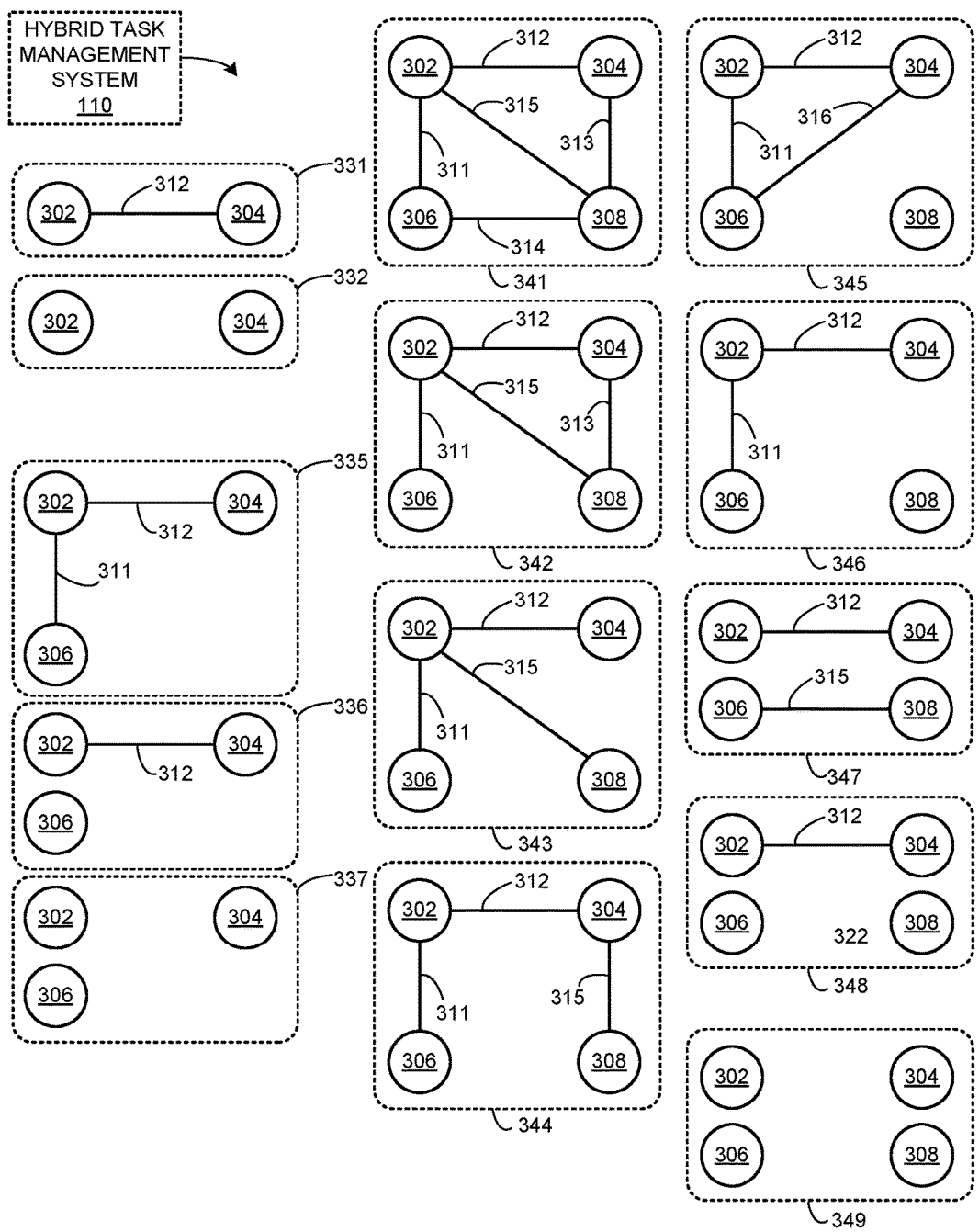
FIG. 3B illustrates exemplary micro graphlets for performing graph-based data mining, in accordance with an embodiment described herein.

FIG. 3B illustrates exemplary micro graphlets for performing graph-based data mining, in accordance with an embodiment described herein. From graphlets 322, 324, and 326, graphlets, system 110 can derive other graphlets of the same size from graph 300. In addition, system 110 can determine edge 312 as a connected graphlet 331 with two vertices, and further obtain a corresponding disconnected graphlet 332 with vertices 302 and 304 (a 2-node-independent graph). From triangle 322, system 110 can determine a set of connected graphlets comprising a 2-star graphlet 335, and a set of disconnected graphlets comprising a 3-node-1-edge graphlet 336 and 3-node-independent graphlet 337.

Similarly, from 4-cycle 324 and 4-clique 326, system 110 can determine a set of connected graphlets comprising a chordal-cycle graphlet 341, a tailed-triangle graphlet 342, a 3-star graphlet 343, and a 4-path graphlet 344. Furthermore, from 4-cycle 324 and 4-clique 326, system 110 can determine a set of disconnected graphlets comprising a 4-node-independent graphlet 349, a 4-node-1-edge graphlet 348, a 4-node-2-edge graphlet 347, a 4-node-2-star graphlet 346, and a 4-node-1-triangle graphlet 345.

It should be noted that diamond and chordal-cycle graphs, and paw and tailed-triangle graphs are interchangeable. System 110 can compute self-complementary graphlets, such as the 4-path graph, by using the properties unique to the graphlets. For example, the 4-path graph is isomorphic to its complement as well as the 5-cycle graphlet. In this way, system 110 can determine connected and disconnected graphlets with 2, 3, and 4 vertices from graph 300.

Figure 3C:
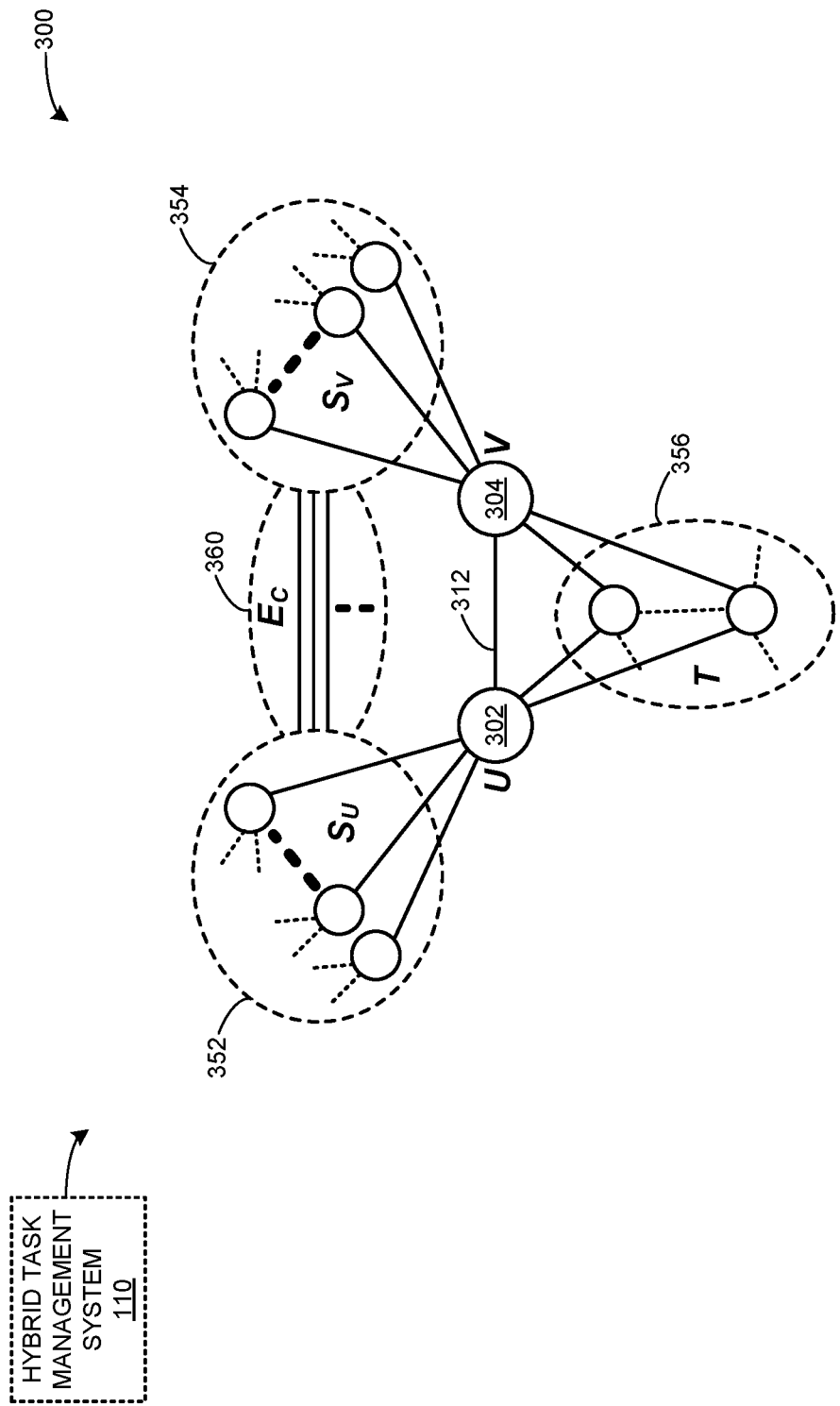
FIG. 3C illustrates an exemplary determination of micro graphlets for performing graph-based data mining, in accordance with an embodiment described herein.

FIG. 3C illustrates an exemplary determination of micro graphlets for performing graph-based data mining, in accordance with an embodiment described herein. To determine an edge neighborhood of edge 312, system 110 determines the neighborhoods of vertices 302 and 304. Since vertices 302 and 304 are in the neighborhoods of each other, system 110 excludes vertices 302 and 304 from the neighborhoods of vertices 304 and 302, respectively, and determines the union of these neighborhoods. The resultant edge neighborhood yields a subgraph comprising the set of vertices adjacent to vertices 302 and 304 (denoted as U and V) (non-inclusive) and all edges between that set.

System 110 leverages the fact that a graphlet can be independently computed for a respective edge-centric neighborhood in graph 300, and therefore, may be computed simultaneously in parallel in individual cores of the one or more processing units of a CPU/GPU. System 110 can also determine the search order in which edges are solved in parallel, the batch size (i.e., the number of edges allocated to a core/processing unit), and the dynamic assignment of tasks (e.g., for load-balancing). For edge 312, system 110 determines a set of vertices completing a triangle with edge 312 (denoted as T). System 110 also determines the sets 352 and 354 of vertices (denoted as $S_U$ and $S_V$, respectively) that form a 2-star with vertices 302 and 304, respectively. Here, sets 352 and 354 may not share a common vertex (e.g., $S_U \cap S_V$ can be empty).

In addition, to determine 4-cycles with respect to edge 312, system 110 determines a set of edges 360 (denoted as $E_C$). In this set, a respective edge has one endpoint in set 352 and the other endpoint in set 354. Furthermore, for that edge in set 360, the endpoint in set 352 is not adjacent to vertex 304 (i.e., not in the neighborhood of vertex 304). In the same way, the endpoint in set 354 is not adjacent to vertex 302 (i.e., not in the neighborhood of vertex 302). This ensures that the cycle formed with edge 312 is a 4-cycle.

Since system 110 orders the vertices for computation, in edge 312, vertex 304 can be the vertex with the larger degree. In other words, the degree of vertex 302 can be less than or equal to the degree of vertex 304. As discussed in conjunction with FIG. 3A, system 110 uses this property to reduce runtime. For example, system 110 avoids searching in both sets 352 and 354 for computing 4-cycles. Instead, system 110 can compute 4-cycles by simply searching one of those sets. Since vertex 302 can have a lower degree, set 352 can be smaller than set 354. To ensure efficient computation, system 110 can computes 4-cycles using set 352. System 110 repeats this process for a respective edge. As a result, the runtime difference can be significant.

To perform graph-based data mining on graph 300, system 110 can represent a respective task as the computations required for a single edge (e.g., edge 312). However, if needed, system 110 may represent an even smaller unit of work. For edge 312, system 110 computes the sets 356 and 352, finds the total number of cliques for edge 312 using set 356, and the total number of cycles using set 352. Note that the computations of the cliques and cycles are independent and thus can be computed simultaneously. In addition, a task can be smaller that may also represent these smaller units of work. For instance, if set 356 (or 352) is large and computationally expensive to compute, system 110 can push set 356 (or 352) to the job queue for multiple cores/processing units to work on. Furthermore, system 110 can break the task associated with set 356 (or 352) into smaller sub-tasks.

Operations

When system 110 allocates a task to a core/processing unit of a CPU or a processing unit of a GPU, that core/processing unit executes the codes that specific task. It should be noted that any of the core of any processing unit can be used for determining any of the tasks. Depending on the uniformity of an edge, system 110 allocates a task to a processing unit of a CPU or a GPU. Furthermore, some of the computations are sequentially executed (e.g., in a for loop). If the execution of a respective iteration of the sequence is independent, system 110 can allocate a respective iteration of the sequence to a different core/processing unit.

Figure 4A:
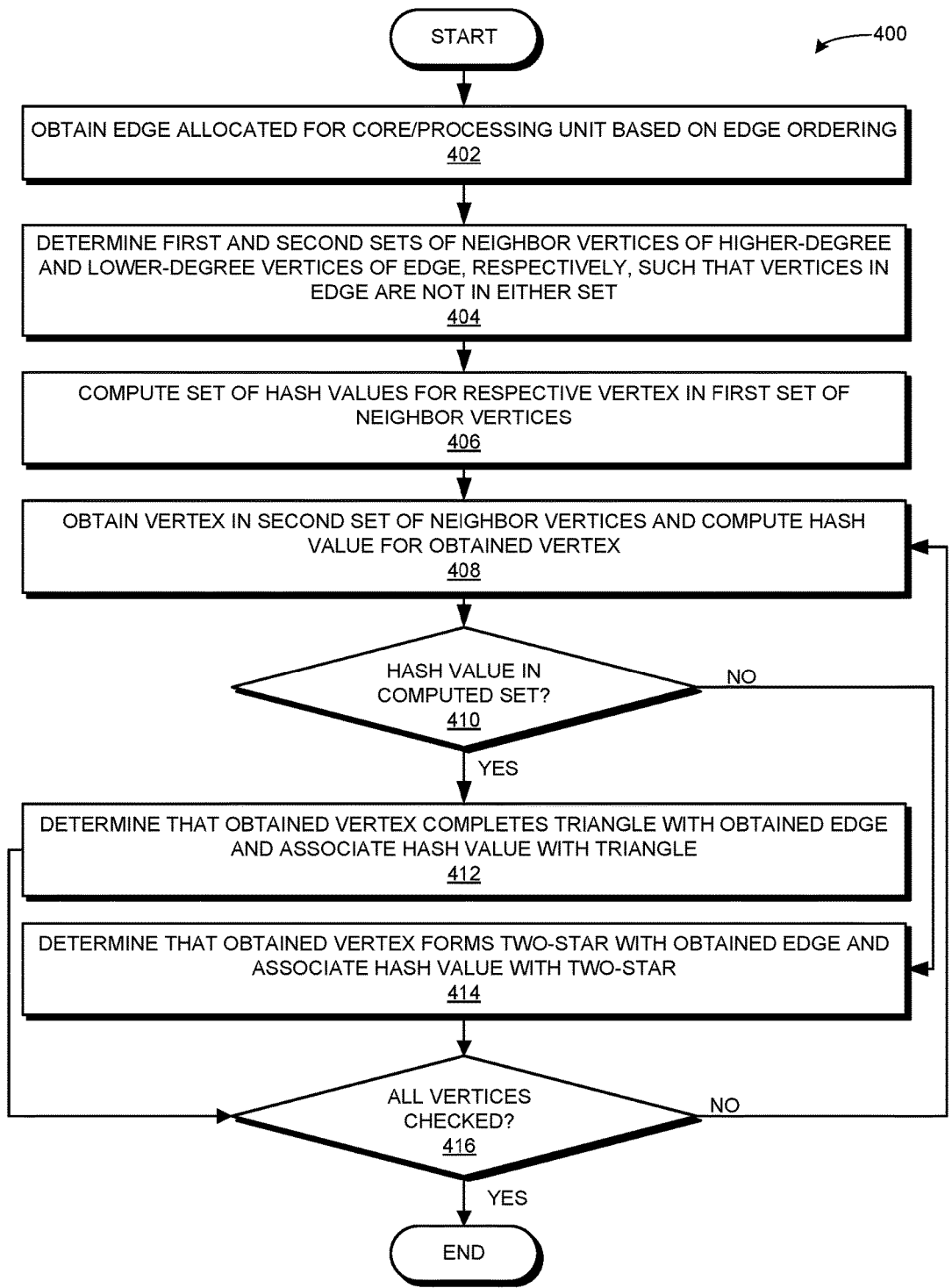
FIG. 4A presents a flowchart illustrating a method of a hybrid task management system computing graphlets based on a hash function, in accordance with an embodiment described herein.

FIG. 4A presents a flowchart illustrating a method 400 of a hybrid task management system computing subgraphs based on a hash function, in accordance with an embodiment described herein. This method can use edge-centric neighbor iteration and a hash table for fast lookups. This method can be executed on a CPU. During operation, the system obtains an edge allocated for a core/processing unit based on the edge ordering (operation 402), as described in conjunction with FIG. 1B. The system determines first and second sets of neighbor vertices of the higher-degree and the lower-degree vertices of the edge, respectively, such that the vertices in the edge are not in either set (operation 404).

The system then computes a set of hash values for a respective vertex in the first set of neighborhood vertices (operation 406). The system obtains a vertex in the second set of neighbor vertices and computes a hash value for the obtained vertex (operation 408) and checks whether the hash value is in the computed set of hash values (operation 410). If the hash value is in the computed set, the system determines that the obtained vertex completes a triangle with the obtained edge and associates the hash value with a triangle (operation 412).

If the hash value is not in the computed set, the system determines that the obtained vertex forms a two-star with the obtained edge and associates the hash value with a two-star (operation 414). Upon determining that the obtained vertex completes a triangle (operation 412) or a two-star (operation 414), the system determines whether all vertices have been checked (operation 416). If not, the system continues to obtain the next vertex in the second set of neighbor vertices and computes a hash value for the obtained vertex (operation 408).

Figure 4B:
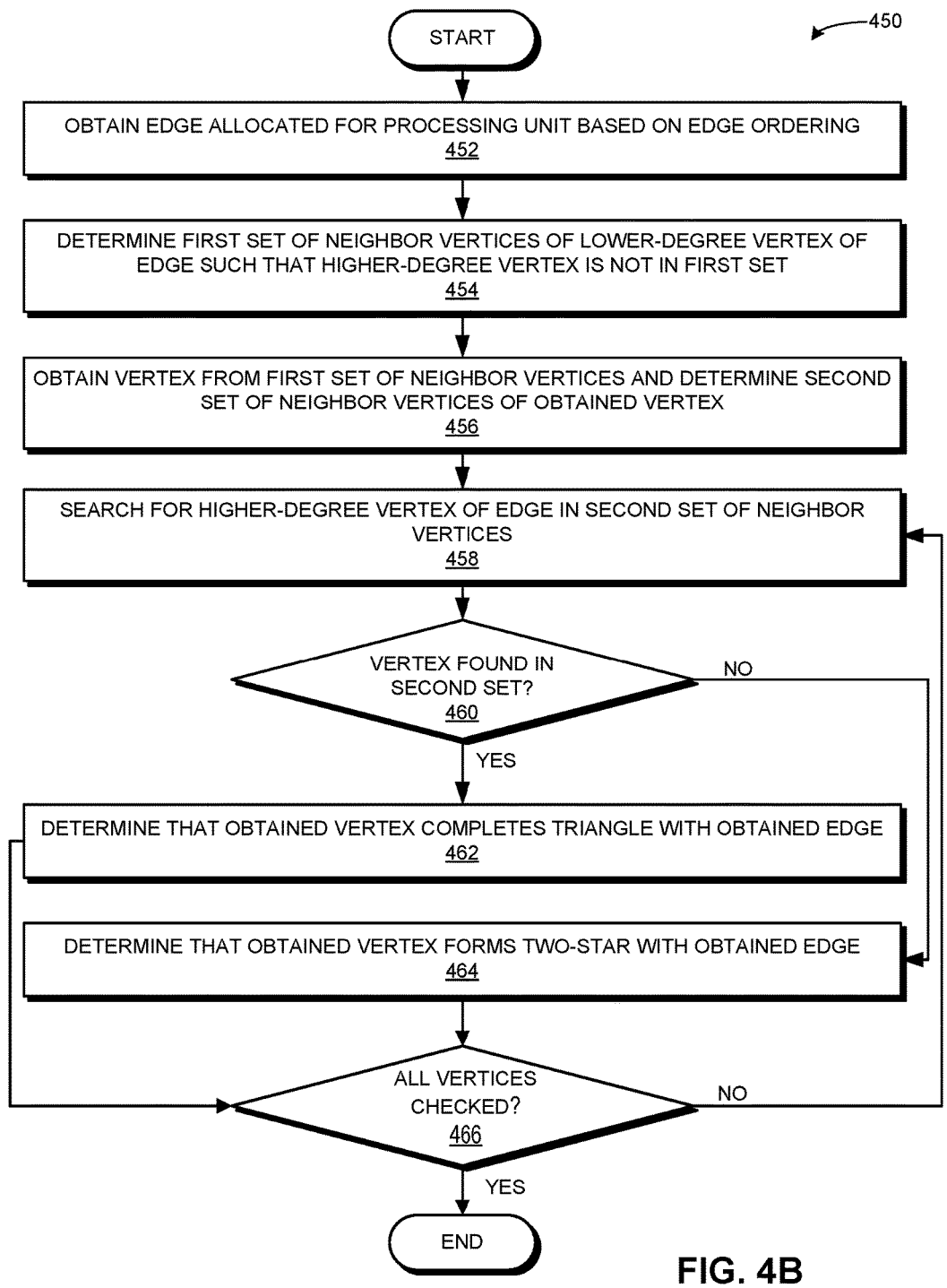
FIG. 4B presents a flowchart illustrating a method of a hybrid task management system computing graphlets based on a neighbor search, in accordance with an embodiment described herein.

FIG. 4B presents a flowchart illustrating a method 450 of a hybrid task management system computing subgraphs based on a neighbor search, in accordance with an embodiment described herein. This method can use a searching technique. This method can be used on multi-core architectures with limited memory, such as a GPU. During operation, the system obtains an edge allocated for the processing system based on the edge ordering (operation 452), as described in conjunction with FIG. 1B. The system determines a first set of neighbor vertices of the lower-degree vertex of the edge such that the higher-degree vertex of the edge is not in the first set (operation 454).

The system obtains a vertex from the first set of neighbor vertices and determines a second set of neighbor vertices of the obtained vertex (operation 456). The system searches for the higher-degree vertex of the edge in the second set of neighbor vertices (operation 458). The system may apply any searching method for performing the search. However, since the vertices are ordered in the graph, the system can efficiently use a binary search algorithm for performing the search. The system then checks whether the higher-degree vertex is found in the second set of neighbor vertices (operation 460). If the higher-degree vertex is found in the second set, the system determines that the obtained vertex completes a triangle with the obtained edge (operation 462).

On the other hand, if the higher-degree vertex is not found in the second set, the system determines that the obtained vertex forms a two-star with the obtained edge (operation 464). Upon determining that the obtained vertex completes a triangle (operation 462) or a two-star (operation 464), the system determines whether all vertices have been checked (operation 466). If not, the system continues to search for the higher-degree vertex of the edge in the second set of neighbor vertices (operation 458).

Figure 5A:
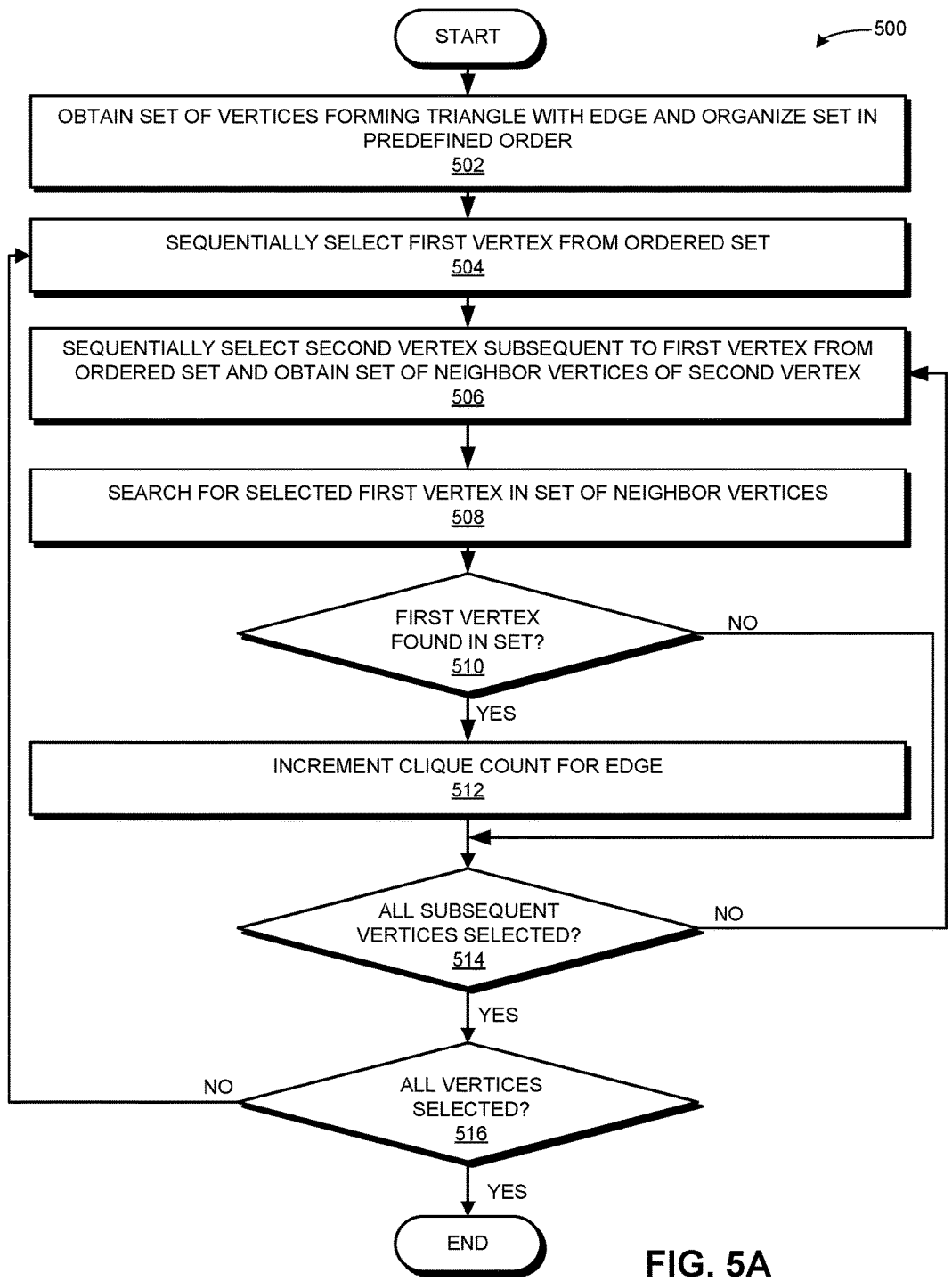
FIG. 5A presents a flowchart illustrating a method of a hybrid task management system computing cliques based on a neighbor search, in accordance with an embodiment described herein.

FIG. 5A presents a flowchart illustrating a method 500 of a hybrid task management system computing cliques based on a neighbor search, in accordance with an embodiment described herein. During operation, the system obtains a set of vertices forming a triangle with an edge and organizes the set in a predefined order (operation 502). The ordering is done in such a way that a respective vertex in the set can be processed in parallel. The system sequentially selects a first vertex from the ordered set (operation 504). The system also sequentially selects a second vertex subsequent to the first vertex from the ordered set and obtains a set of neighbor vertices of the second vertex (operation 506).

The system searches for the selected first vertex in the set of neighbor vertices (operation 508). The system checks whether the first vertex is found in the set of neighbor vertices (operation 510). If the first vertex is found in the set, the system increments a clique count for the edge (operation 512). If the first vertex is not found in the set (operation 510) or the clique count for the edge has been incremented (operation 512), the system checks whether all subsequent vertices of the first vertex (i.e., all subsequent second vertices) have been selected (operation 514).

If all subsequent vertices of the first vertex have not been selected, the system continues to sequentially select the next second vertex subsequent to the first vertex from the ordered set and obtains a set of neighbor vertices of the second vertex (operation 506). On other hand, if all subsequent vertices of the first vertex have been selected, the system determines whether all vertices have been selected (operation 516). If all vertices have not been selected, the system continues to sequentially select the next vertex (i.e., the next first vertex) from the ordered set (operation 504). It should be noted that each iteration of operation 504 and all subsequent nested operations of that iteration, as indicated by operation 516, can be executed in parallel in different cores/processing units.

Figure 5B:
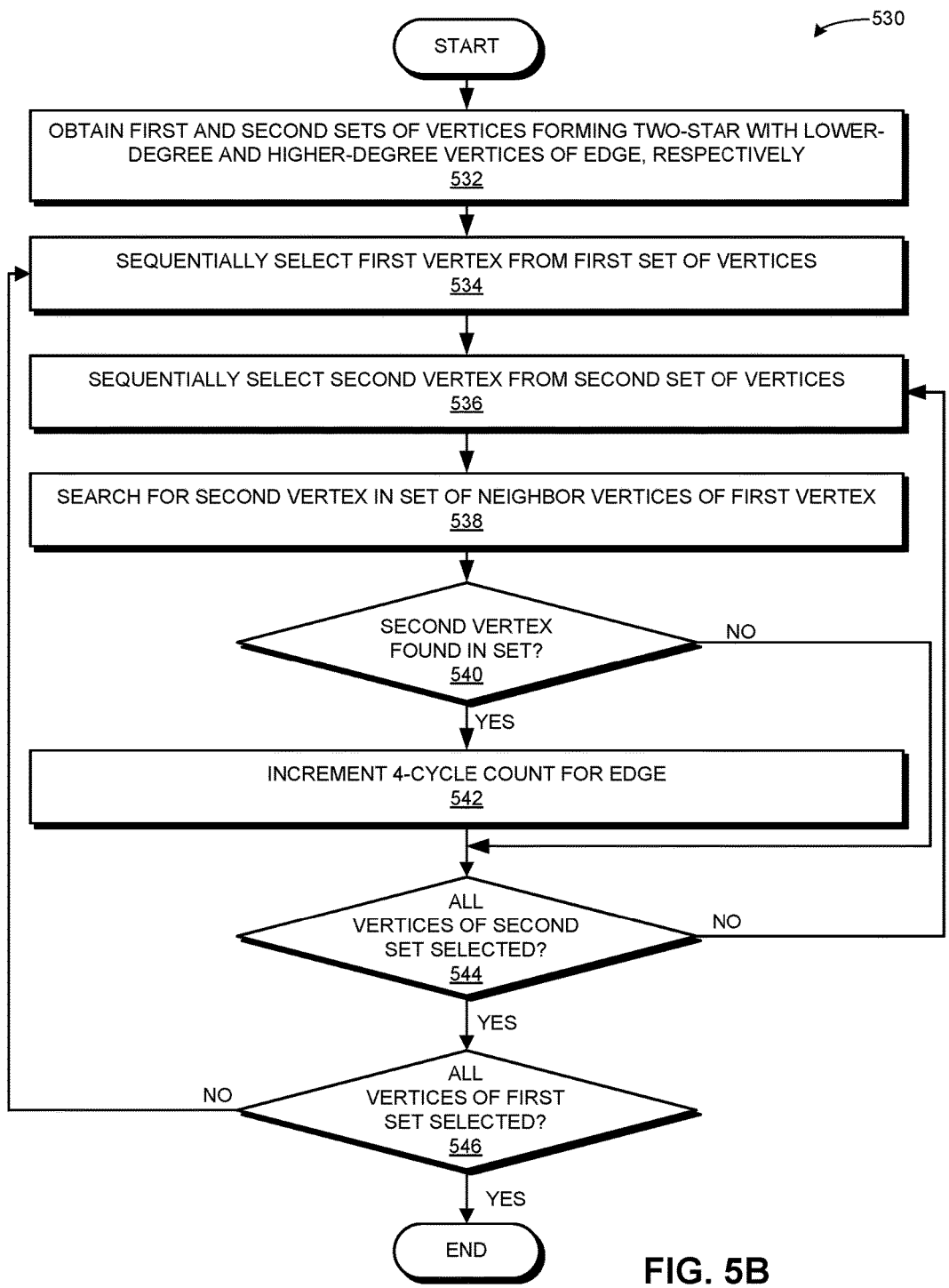
FIG. 5B presents a flowchart illustrating a method of a hybrid task management system computing cycles based on a neighbor search, in accordance with an embodiment described herein.

FIG. 5B presents a flowchart illustrating a method 530 of a hybrid task management system computing cycles based on a neighbor search, in accordance with an embodiment described herein. During operation, the system obtains first and second sets of vertices forming a two-star with lower-degree and higher-degree vertices of an edge, respectively (operation 532). The system sequentially selects a first vertex from the first set of vertices (operation 534). The system also sequentially selects a second vertex from the second set of vertices (operation 536). The system then searches for the second vertex in the set of neighbor vertices of the first vertex (operation 538).

The system checks whether the second vertex is found in the set of neighbor vertices of the first vertex (operation 540). If the second vertex is found in the set, the system increments a 4-cycle count for the edge (operation 542). If the first vertex is not found in the set (operation 540) or the 4-cycle count for the edge has been incremented (operation 542), the system checks whether all vertices of the second set have been selected (operation 544). If all vertices of the second set have not been selected, the system continues to sequentially select a second vertex from the second set of vertices (operation 536).

On other hand, if all vertices of the second set have been selected, the system determines whether all vertices of the first set have been selected (operation 546). If all vertices of the first set have not been selected, the system continues to sequentially select a first vertex from the first set of vertices (operation 534). It should be noted that each iteration of operation 534 and all subsequent nested operations of that iteration, as indicated by operation 546, can be executed in parallel in different cores/processing units.

Figure 5C:
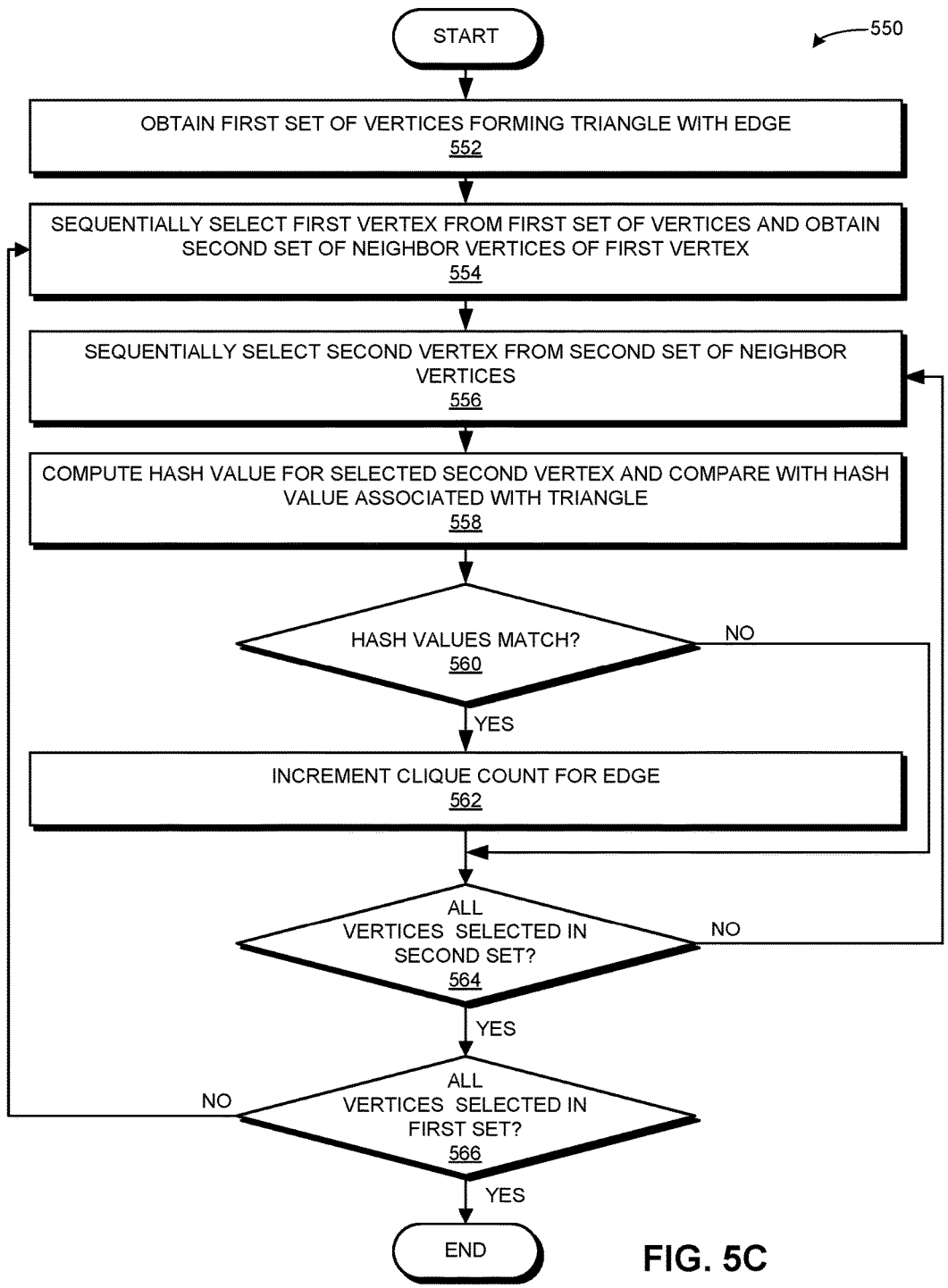
FIG. 5C presents a flowchart illustrating a method of a hybrid task management system computing cliques based on a hash function, in accordance with an embodiment described herein.

FIG. 5C presents a flowchart illustrating a method 550 of a hybrid task management system computing cliques based on a hash function, in accordance with an embodiment described herein. During operation, the system obtains a first set of vertices forming a triangle with an edge (operation 552). The system sequentially selects a first vertex from the first set of vertices and obtains a second set of neighbor vertices of the first vertex (operation 554). The system sequentially selects a second vertex from the second set of neighbor vertices (operation 556).

The system then computes a hash value for the selected second vertex and compares it with the hash value associated with the triangle, as described in conjunction with FIG. 4A (operation 558). The system checks whether the hash values match (operation 560). If the hash values match, the system increments a clique count for the edge (operation 562). If the hash values do not match (operation 560) or the clique count for the edge has been incremented (operation 562), the system checks whether all vertices of the second set have been selected (operation 564). If all vertices of the second set have not been selected, the system continues to select a second vertex from the second set of neighbor vertices (operation 556).

On other hand, if all vertices of the second set have been selected, the system checks whether all vertices of the first set have been selected (operation 566). If all vertices of the first set have not been selected, the system continues to sequentially select a first vertex from the first set of vertices and obtains a second set of neighbor vertices of the first vertex (operation 554). It should be noted that each iteration of operation 554 and all subsequent nested operations of that iteration, as indicated by operation 566, can be executed in parallel in different cores/processing units.

Figure 5D:
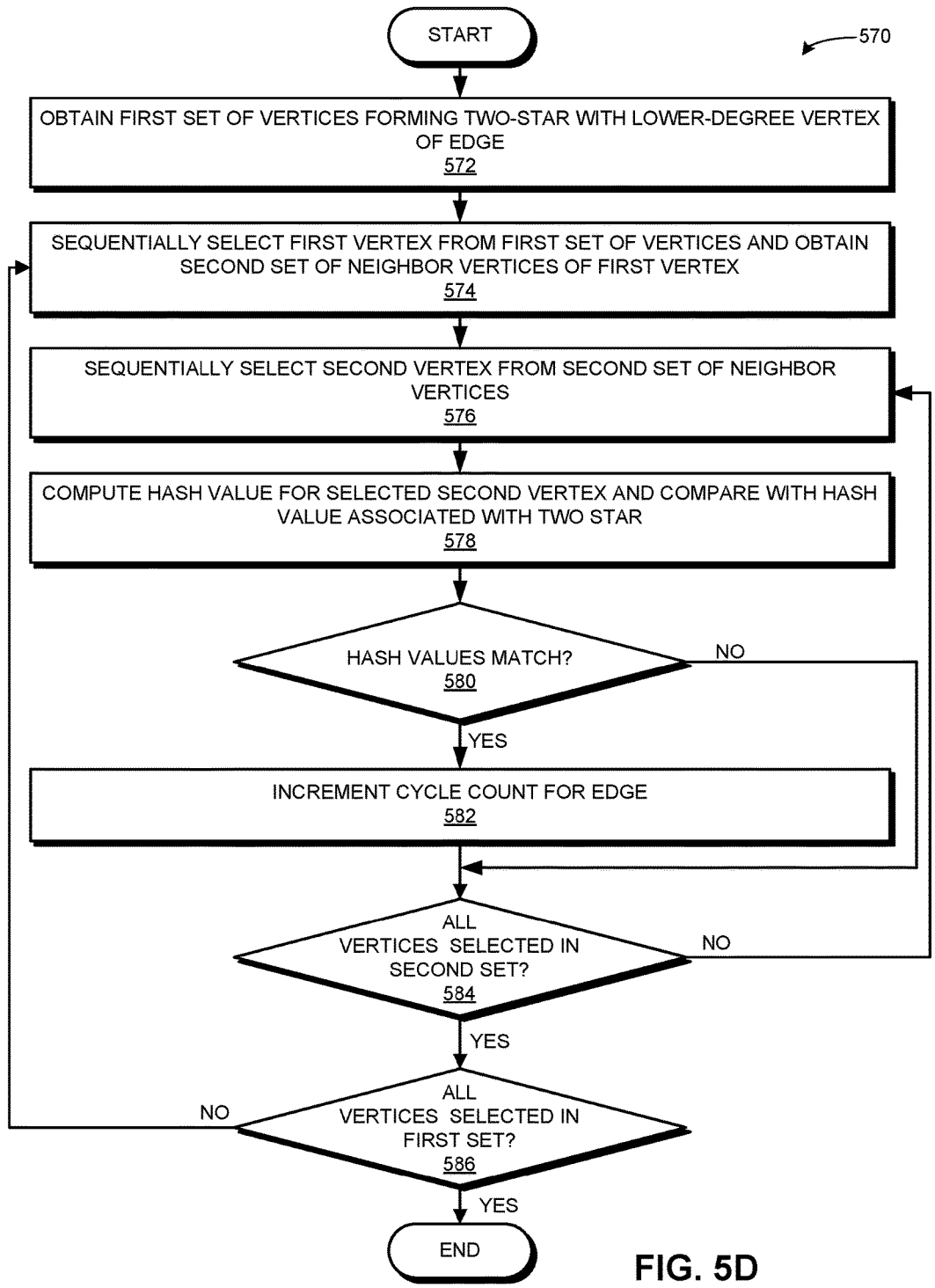
FIG. 5D presents a flowchart illustrating a method of a hybrid task management system computing cycles based on a hash function, in accordance with an embodiment described herein.

FIG. 5D presents a flowchart illustrating a method 570 of a hybrid task management system computing cycles based on a hash function, in accordance with an embodiment described herein. During operation, the system obtains a first set of vertices forming a two-star with the lower-degree vertex of an edge (operation 572). The system sequentially selects a first vertex from the first set of vertices and obtains a second set of neighbor vertices of the first vertex (operation 574). The system sequentially selects a second vertex from the second set of neighbor vertices (operation 576).

The system then computes a hash value for the selected second vertex and compares it with the hash value associated with the two-star, as described in conjunction with FIG. 4A (operation 578). The system checks whether the hash values match (operation 580). If the hash values match, the system increments a cycle count for the edge (operation 582). If the hash values do not match (operation 580) or the cycle count for the edge has been incremented (operation 582), the system checks whether all vertices of the second set have been selected (operation 584). If all vertices of the second set have not been selected, the system continues to select a second vertex from the second set of neighbor vertices (operation 576).

On other hand, if all vertices of the second set have been selected, the system checks whether all vertices of the first set have been selected (operation 586). If all vertices of the first set have not been selected, the system continues to sequentially select a first vertex from the first set of vertices and obtains a second set of neighbor vertices of the first vertex (operation 574). It should be noted that each iteration of operation 574 and all subsequent nested operations of that iteration, as indicated by operation 586, can be executed in parallel in different cores/processing units.

Global Computation

System 110 can compute sets T and $S_U$ using the method described in conjunction with FIG. 4A for a CPU and the method described in conjunction with FIG. 4B for a GPU (and a CPU if memory is limited and/or dynamically selected by system 110). The key difference is that a CPU can create a fast hash table for a fast lookup. In this way, system 110 can derive a respective subgraph using only the local edge-based counts of triangles, cliques, and cycles. Suppose that the number of vertices in a graph is N and the number of edges in the graph is M.

As described above, a GPU can compute a triangle (as well as T and $S_U$) for an edge (or a vertex) using the method described in conjunction with FIG. 4B, and a CPU can compute the same using the method described in conjunction with FIG. 4A. Afterwards, cliques and cycles can be computed in any order since they are independent. A GPU and a CPU can compute a clique using the methods described in conjunction with FIGS. 5A and 5C, respectively. Similarly, a GPU and a CPU can compute a cycle using the methods described in conjunction with FIGS. 5B and 5D, respectively. However, a CPU may use the method described in conjunction with FIG. 5A or 5B if system 110 dynamically determines that the CPU should be allocated less work (e.g., if its memory is limited).

Furthermore, the unrestricted counts of subgraphs can be derived from only local triangle counts, cliques, and cycles, which are computed for each edge. In addition to these computations, system 110 may require a few other parameters that can be derived in constant time (such as a vertex degree, the number of edges and vertices in a graph, etc.). System 110 may not store these parameters and can simply derive them on-the-fly in constant time. Based on the counts for the triangles, cliques, and cycles for a respective edge (or a vertex) of the graph, system 110 can compute any other subgraph for the graph. Such counts can be combined to determine the macro or global count the whole graph, as described in conjunction with FIG. 2A. It should be noted that the system can determine a respective global count for a subgraph of any size.

Exemplary Computer and Communication System

Figure 6:
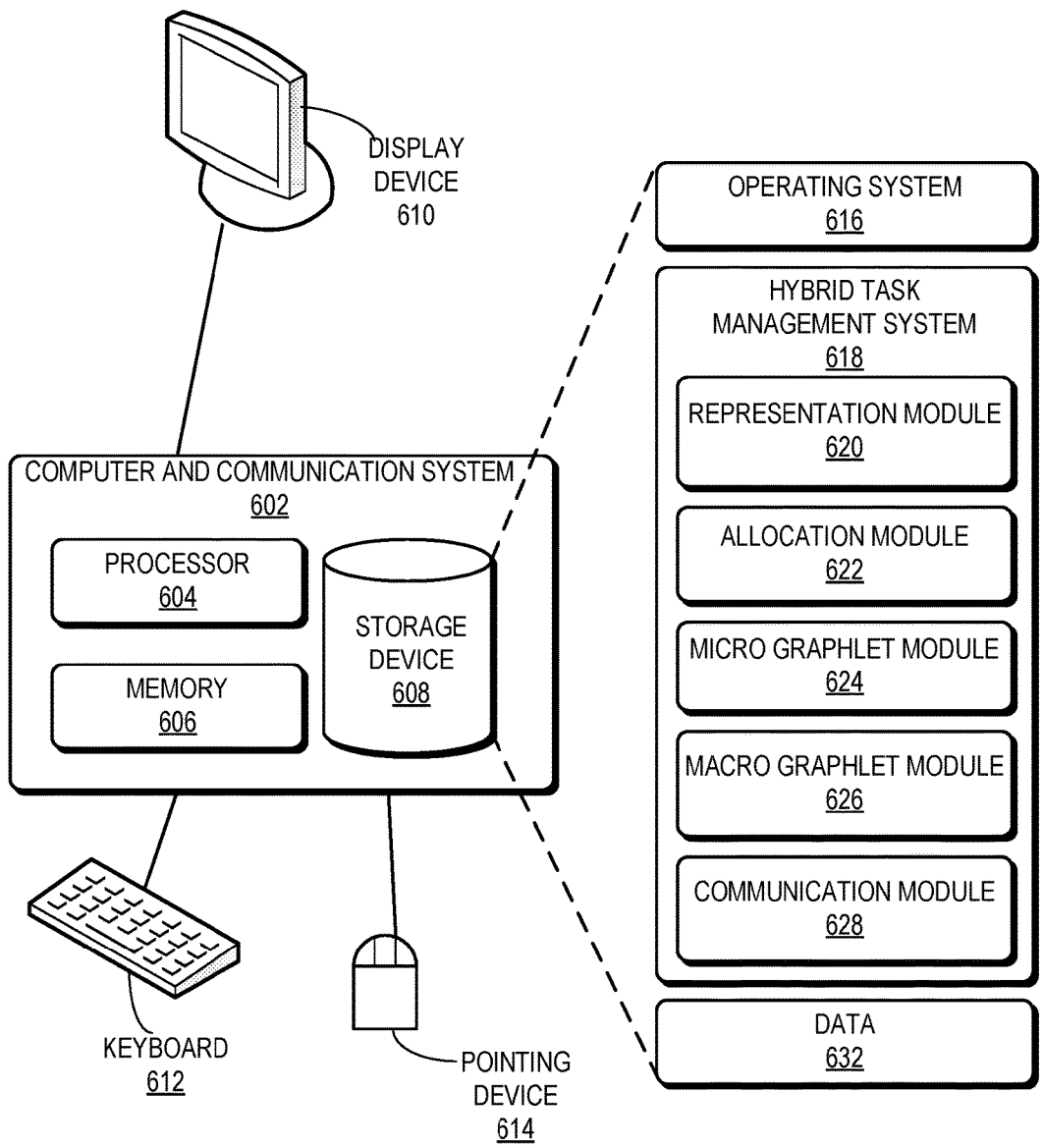
FIG. 6 illustrates an exemplary computer and communication system that facilitates a hybrid task management system, in accordance with an embodiment described herein.

FIG. 6 illustrates an exemplary computer and communication system that facilitates a hybrid task management system, in accordance with an embodiment described herein. A computer and communication system 602 includes a processor 604, a memory 606, and a storage device 608. Memory 606 can include a volatile memory (e.g., RAM) that serves as a managed memory, and can be used to store one or more memory pools. Furthermore, computer and communication system 602 can be coupled to a display device 610, a keyboard 612, and a pointing device 614. Storage device 608 can store an operating system 616, a hybrid task management system 618, and data 632.

Hybrid task management system 618 can include instructions, which when executed by computer and communication system 602, can cause computer and communication system 602 to perform the methods and/or processes described in this disclosure. Hybrid task management system 618 includes instructions for representing a data set as a graph with corresponding vertices and edges (representation module 620). Hybrid task management system 618 can also include instructions for ordering the vertices based on corresponding degrees (representation module 620). Hybrid task management system 618 further includes instructions for ordering the edges based on corresponding uniformity (representation module 620).

Hybrid task management system 618 can also include instructions for determining individual edge-induced graphlets (e.g., based on edge neighborhoods) (allocation module 622). Hybrid task management system 618 may include instructions for determining individual vertex-induced graphlets (e.g., based on vertex neighborhoods) (allocation module 622). Hybrid task management system 618 can include instructions for determining tasks associated with graph-based data mining to a corresponding core/processing unit of a CPU or a GPU based on the ordering of the edges (allocation module 622). Hybrid task management system 618 can include instructions for computing micro graphlets, in parallel, using the cores/processing units of a CPU and a GPU (micro graphlet module 624). Hybrid task management system 618 can also include instructions for computing macro graphlets using micro graphlet counts (macro graphlet module 626).

In some embodiments, hybrid task management system 618 can include instructions for displaying, via display device 610 using a graphical or textual interface, the resultant micro and macro graphlet counts (communication module 628). Hybrid task management system 618 can also include instructions for exchanging information with other devices (communication module 628). Data 632 can include any data that is required as input or that is generated as output by the methods and/or processes described in this disclosure. Data 632 can include one or more of: a data set, one or more data structures representing a graph, one or more data structures storing vertex and/or edge ordering of the graph, and one or more data structures storing computation results.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method for facilitating hybrid task management across one or more central processing units (CPUs) and one or more graphics processing unit (GPUs) of a computer, the method comprising:
   determining, by the computer, a set of tasks for performing data mining on a data set by:
   determining a strength of relationship between a first and a second data element in the data set; and
   representing the strength of relationship as an edge between a first vertex representing the first data element and a second vertex representing the second data element in a graph;
   storing the set of tasks in a data structure in an ascending order of uniformity associated with a respective task, wherein the uniformity of a task indicates how uneven and skewed the task is compared to other tasks in the set of tasks;
   allocating a first subset of tasks to a first CPU of the one or more CPUs from a front of the data structure; and
   allocating a second subset of tasks to a first GPU of the one or more GPUs from a back of the data structure, wherein the front and the back of the data structure indicate a first element and a last element, respectively, in the ascending order of uniformity in the data structure.

2. The method of claim 1, wherein a respective task includes determining a count for a set of graphlets based on a first edge or a first vertex of a graph; and
   wherein uniformity associated with a task is based on the uniformity of the first edge or the first vertex, respectively.

3. The method of claim 1, further comprising determining a count of subgraphs formed with a first edge or a first vertex of the graph.

4. The method of claim 1, further comprising:
   determining one of:
   sets of graph properties for respective edges of the graph; and
   sets of graph properties for respective vertices of the graph; and
   combining the sets of graph properties to determine a global set of graph properties for the graph.

5. The method of claim 4, further comprising calculating additional sets of graph properties from the set of graph properties for respective edges or vertices of the graph based on constant time computations.

6. The method of claim 4, further comprising searching for the set of graph properties for respective edges or vertices of the graph using one of: a binary search and a hash function.

7. The method of claim 1, wherein each of the one or more CPUs and the one or more GPUs includes a plurality of cores.

8. The method of claim 7, further comprising determining the second subset of tasks by determining a non-overlapping set of tasks for a respective GPU of the one or more GPUs from the back of the data structure.

9. The method of claim 1, further comprising:
   in response to the first CPU completing the first subset of tasks, allocating a task from a front of a subset of an unallocated task to the first CPU; and
   in response to the first GPU completing the second subset of tasks, allocating a task from a back of a subset of the unallocated task to the first GPU.

10. A non-transitory computer-readable storage medium storing instructions that when executed by a computer cause the computer to perform a method for facilitating hybrid task management across one or more central processing units (CPUs) and one or more graphics processing units (GPUs) of a computer, the method comprising:
    determining, by the computer, a set of tasks for performing data mining on a data set by:
    determining a strength of relationship between a first and a second data element in the data set; and
    representing the strength of relationship as an edge between a first vertex representing the first data element and a second vertex representing the second data element in a graph;
    storing the set of tasks in a data structure in an ascending order of uniformity associated with a respective task, wherein the uniformity of a task indicates how uneven and skewed the task is compared to other tasks in the set of tasks;
    allocating a first subset of tasks to a first CPU of the one or more CPUs from a front of the data structure; and
    allocating a second subset of tasks to a first GPU of the one or more GPUs from a back of the data structure, wherein the front and the back of the data structure indicate a first element and a last element, respectively, in the ascending order of uniformity in the data structure.

11. The computer-readable storage medium of claim 10, wherein a respective task includes determining a count for a set of graphlets based on a first edge or a first vertex of a graph; and
    wherein uniformity associated with a task is based on the uniformity of the first edge or the first vertex, respectively.

12. The computer-readable storage medium of claim 10, wherein the method further comprises determining a count of subgraphs formed with the first edge or the first vertex.

13. The computer-readable storage medium of claim 10, wherein the method further comprises:
    determining one of:
    sets of graph properties for respective edges of the graph; and
    sets of graph properties for respective vertices of the graph; and
    combining the sets of graph properties to determine a global set of graph properties for the graph.

14. The computer-readable storage medium of claim 13, wherein the method further comprises calculating additional sets of graph properties from the sets of graph properties for respective edges or vertices of the graph based on constant time computations.

15. The computer-readable storage medium of claim 13, wherein the method further comprises searching for the sets of graph properties for respective edges or vertices of the graph using one of: a binary search and a hash function.

16. The computer-readable storage medium of claim 10, wherein each of the one or more CPUs and the one or more GPUs includes a plurality of cores.

17. The computer-readable storage medium of claim 16, wherein the method further comprises determining the second subset of tasks allocated to the first GPU by determining a non-overlapping set of tasks for a respective GPU of the one or more GPUs from the back of the data structure.

18. The computer-readable storage medium of claim 10, wherein the method further comprises:
  in response to the first CPU completing the first subset of tasks, allocating a task from a front of a subset of an unallocated task to the first CPU; and
  in response to the first GPU completing the second subset of tasks, allocating a task from a back of a subset of the unallocated task to the first GPU.

* * * * *